INVENTORS H. J. MICHAEL
C. E. MORSE
F. G. ORAM
E. J. ROCCATI
J. P. SMITH

BY S.E. Hollander
ATTORNEY

United States Patent Office 3,419,683

Patented Dec. 31, 1968

3,419,683

AUTOMATIC SUBSTATION TRANSFER SYSTEM

Henry J. Michael, Rumson, Charles E. Morse, Holmdel, Frank G. Oram, Belford, Edgar J. Roccati, Whippany, and John P. Smith, Holmdel, N.J., assignors to Bell Telephone Laboratories, Incorporated, New York, N.Y., a corporation of New York Filed Oct. 22, 1965, Ser. No. 500,774
16 Claims. (Cl. 179—18)

ABSTRACT OF THE DISCLOSURE

Access from a high-priority substation is arranged through two or more concentrators each connected to a different central office. All trunks-busy or out-of-service conditions on one concentrator will transfer the substation line to the other concentrator.

This invention relates to telephone switching systems and more particularly to telephone substations having access to two or more telephone line concentrator systems.

The use of telephone concentrator systems to reduce the cost of outside plant by providing shared access to a telephone office by a larger number of lines over a smaller number of trunks is well known. A remote switching unit is controlled from the office to establish connections between the lines and trunks as required on originating and terminating calls.

Ordinarily, the traffic requirements of the lines and the ratio of lines to trunks are designed to insure that, under ordinary circumstances, a line going off-hook will find a trunk available to the central office. If an all-trunks busy condition exists, however, a calling line will not have access to the office unless it is provided with special facilities for initiating a priority call. For an explanation of a concentrator in which lines are equipped for priority calls, reference may be made to a patent application Ser. No. 501,878 of G. F. Clement et al. filed on even date herewith and the applications therein referred to. As described in that application 40 lines may be connected over 20 trunks to a telephone office and each line has access to all 20 trunks. If all trunks are busy, the transmission of an appropriate priority signaling indication will effect the disconnection of a trunk serving a lower priority call even though the conversation thereon is still in progress.

Although such a system is completely operative and useful, the contingencies under which such priority calling are required include as discussed in Clement et al. wide-spread civil disaster due to flooding, hurricanes and the like and also damage sustained by military action including bombing sabotage.

Under the latter conditions it is possible that although a path to the central office may be established by priority signaling techniques or otherwise, the office itself may have been destroyed or rendered inoperative.

Moreover, it is evident that under such civil and military emergency conditions it becomes all the more necessary to be able to complete essential telephone connections. It does not require elaboration to understand that the role of the Red Cross and other relief agencies is rendered more burdensome, if not wholly overwhelming, when in the course of a major disaster a catastrophic failure in telephone communications is also present.

For these reasons, it is desirable to provide to selected telephone substations a degree of "back-up" protection and enhanced reliability which under ordinary circumstances is available in telephone practice only at a much higher level in the heirarchy of a telephone switching network, i.e., between telephone central offices.

It is therefore an object of this invention to provide enhanced reliability of operation in completing telephone connections by permitting the extension of a telephone substation to two or more central offices.

It is apparent further that the connectability of a single telephone substation to two or more central offices gives rise to a number of problems which do not exist in conventional arrangements where a line is connectable only to a particular local office.

Assuming as referred to in general above that concentrator lines are involved, the connection and termination of a single substation line on two or more concentrators presents unique difficulties in view of the physical disassociation of the concentrators from each other. Thus, for example, if a call is initiated by the substation, a problem arises as to which concentrator will service the call. The problem is compounded if the concentrator selector for the call has an all-trunks busy condition thereon. A similar difficulty ensues if the concentrator selected for the call is out of service or if the office to which such concentrator extends has been destroyed or rendered inoperative for the reasons referred to above.

Under such conditions facilities must be available to transfer the substation line to the other concentrator in order to permit the extension of a connection to a functioning telephone office. Considering the motivating purpose for effecting such transfers, it is essential that the equipment for executing the transfer must be of a degree of reliability and simplicity consonant with the over-all purpose of the equipment.

Moreover, the technical problem of completing a terminating call to a single substation from a plural number of concentrators is manifest when it is considered that the substation may, in a quiescent condition, be coupled to a particular concentrator when a terminating connection from another concentrator to the same substation line is initiated. A similar difficulty obtains when the single substation line is actually engaged in a conversation connection over one of the concentrators and a terminating connection to the line is attempted over another of the concentrators.

It is therefore an object of this invention to provide for the extension of telephone substations connected to a concentrator system to two or more different central offices.

Still another object of this invention is to provide for the extension of lines over two or more different concentrators to two or more associated offices.

A further object of this invention is to provide for the extension of an originating connection over the concentrator last used by the line for either an originating or terminating connection.

Another object of this invention is to provide for the extension of a connection over a second remote concentrator when the concentrator remaining connected to the line, after the last call, is in an all-trunks busy condition.

Still another object of this invention is to provide for the extension of a connection over a second concentrator circuit when the concentrator remaining connected to the line, after the prior call has been completed, is out-of-service.

These and other objects and features of the invention are achieved in a specific illustrative embodiment in which a dual access switch circuit is provided between each line to be served and two or more remote concentrators which extend the line to associated central offices. As shown in the subsequent description, the arrangement is adapted in the event of an out-of-service or all-trunks busy condition at the concentrator remaining connected to the line, after the prior connection has been completed, to automatically transfer the line to a different concentrator.

Moreover, the circuit provides, in the event of a terminating call to a line coupled to a remote concentrator having an all-trunks busy condition thereon, for transferring the line to a second remote concentrator and for redirecting the terminating call through a telephone central office connected to the second remote concentrator.

It will be seen that by placing dual access switch circuits in tandem, access may be had by any one line to three or more concentrators.

These and other objects and features of the invention may be more readily comprehended from an examination of the following specification, appended claims and attached drawing in which:

*General description*

Figure 1A:
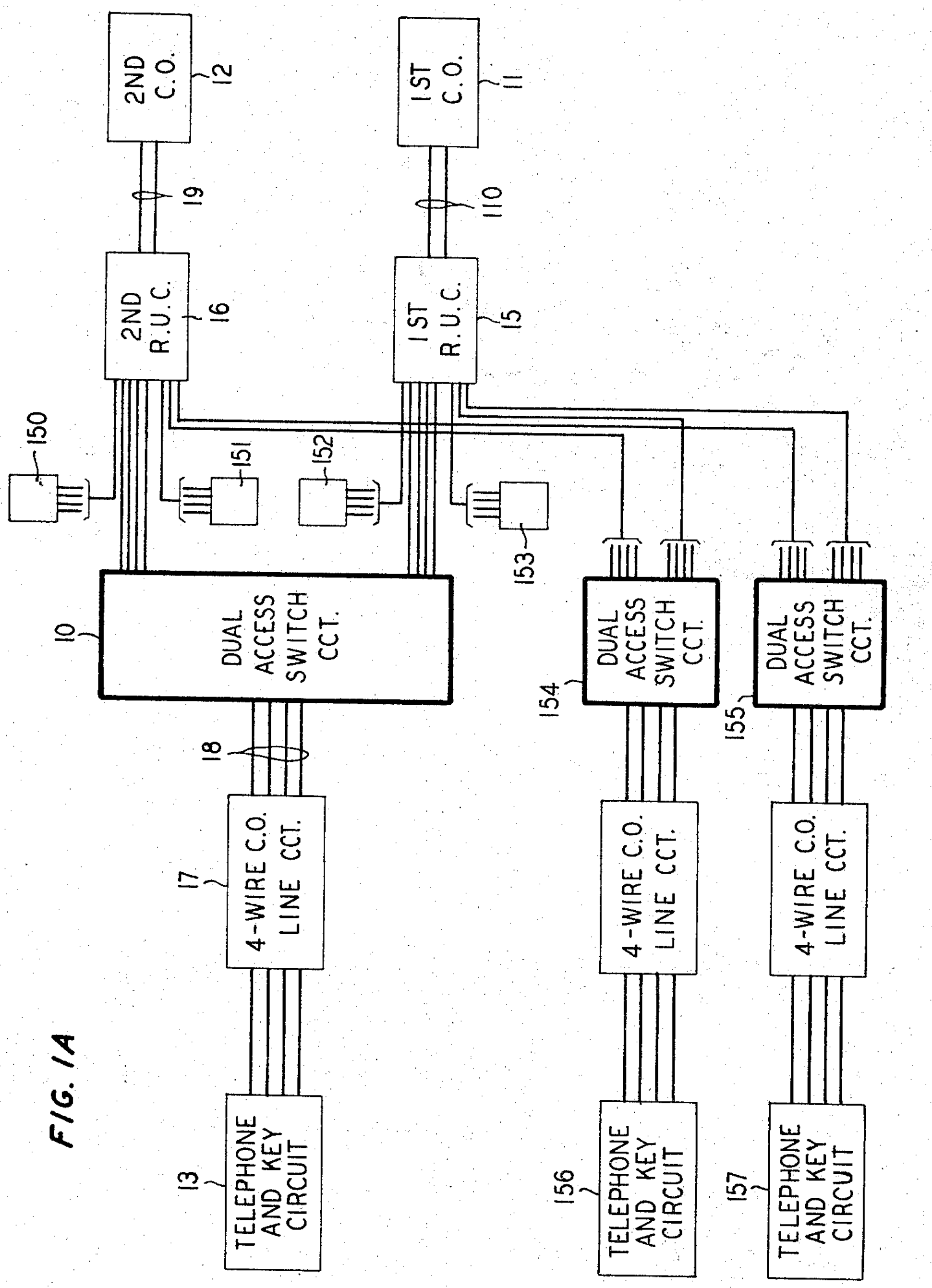
FIG. 1A shows a block diagram of one specific, illustrative embodiment of the inventive arrangement including the dual access circuit.

As shown in FIG. 1A, a telephone and key circuit 13 illustratively of the 4-wire type is connectable through a 4-wire central office line circuit 17 and a transmission channel 18 to a dual access switch 10. The latter provides access from substation 13 to a first remote unit concentrator 15 and a second remote unit concentrator 16. Switches 154 and 155 provide similar facilities for telephone circuits 156 and 157. The concentrators are disposed intermediate the dual access switches 10, 154 and 155 and the respective central offices 11 and 12.

It is understood that additional substations similar to substation 13 may be terminated on both the first concentrator 15 and the second concentrator 16 either directly as for substations 150–153 or through additional dual access switches. Illustratively, 40 substations may be connected to each of the concentrators as indicated in the above-referred-to Clement et al. disclosure. As seen in the present arrangement, the same 40 lines may be terminated at concentrator 15 and also concentrator 16.

The dual access circuit 10 is individual to substation 13 and may be utilized to extend a connection to either the first concentrator or the second concentrator in accordance with the availability of an illustrative twenty trunks 19 and 110 extending to the central offices. Also, as will be shown herein, substation 13 will ordinarily remain connected over switch 10 to the same concentrator which was used in the most recent priorly effected originating or terminating connection to the line.

Figure 1B:
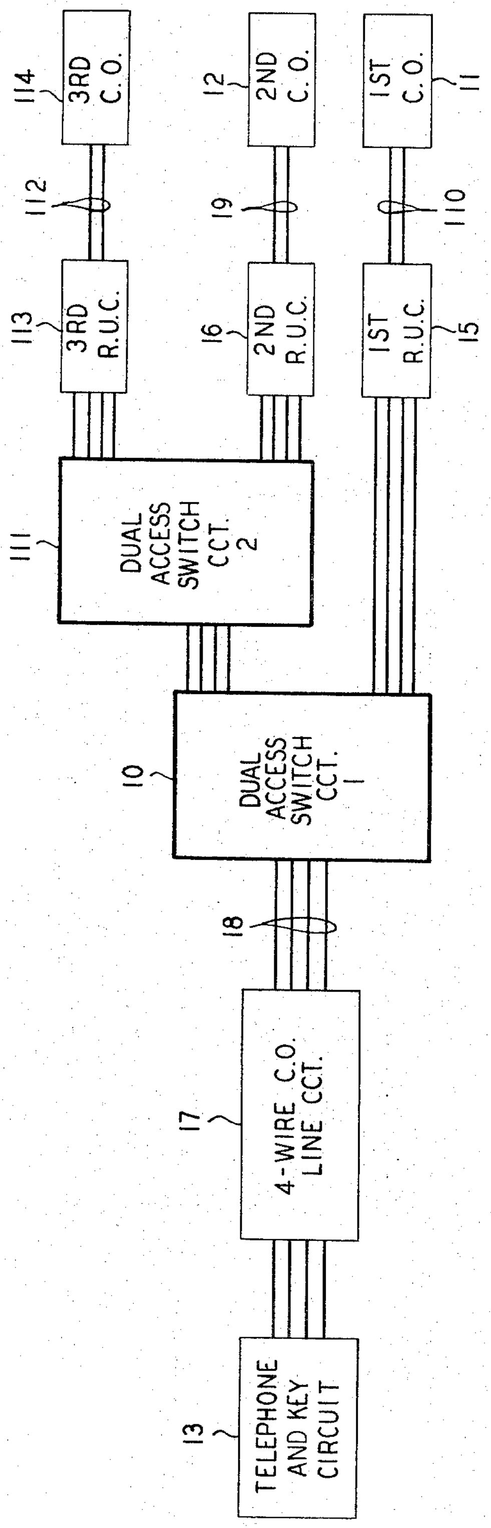
FIG. 1B shows a block diagram of another specific, illustrative embodiment of the inventive arrangement including tandemly arranged dual access switches.

As shown in FIG. 1B, substation 13 may be extended to still more central offices over additional concentrators by the use of dual access switches in a tandem arrangement. Thus, dual access switch 10 is connectable to the first remote unit concentrator 15 and also to a separate dual access switch 111. The latter may be extended to the second remote unit concentrator 16 and also to an additional concentrator 113. As before the concentrators are further extended over trunks 110, 19 and 112 to the respective central offices. Again, illustratively, each concentrator may service 40 lines (or dual access switches) over 20 trunks to the office.

Following the procedure described herein in detail, substation 13 may be extended to a termination at any one of the three central offices 11, 12 and 114. Similarly, calls may be terminated to substation 13 from any of the three central offices.

*Detailed description—Service request call*

At the outset it will be noted in FIGS. 2–5 that all potentials not otherwise indicated are assumed to be −24 volts.

Figure 2:
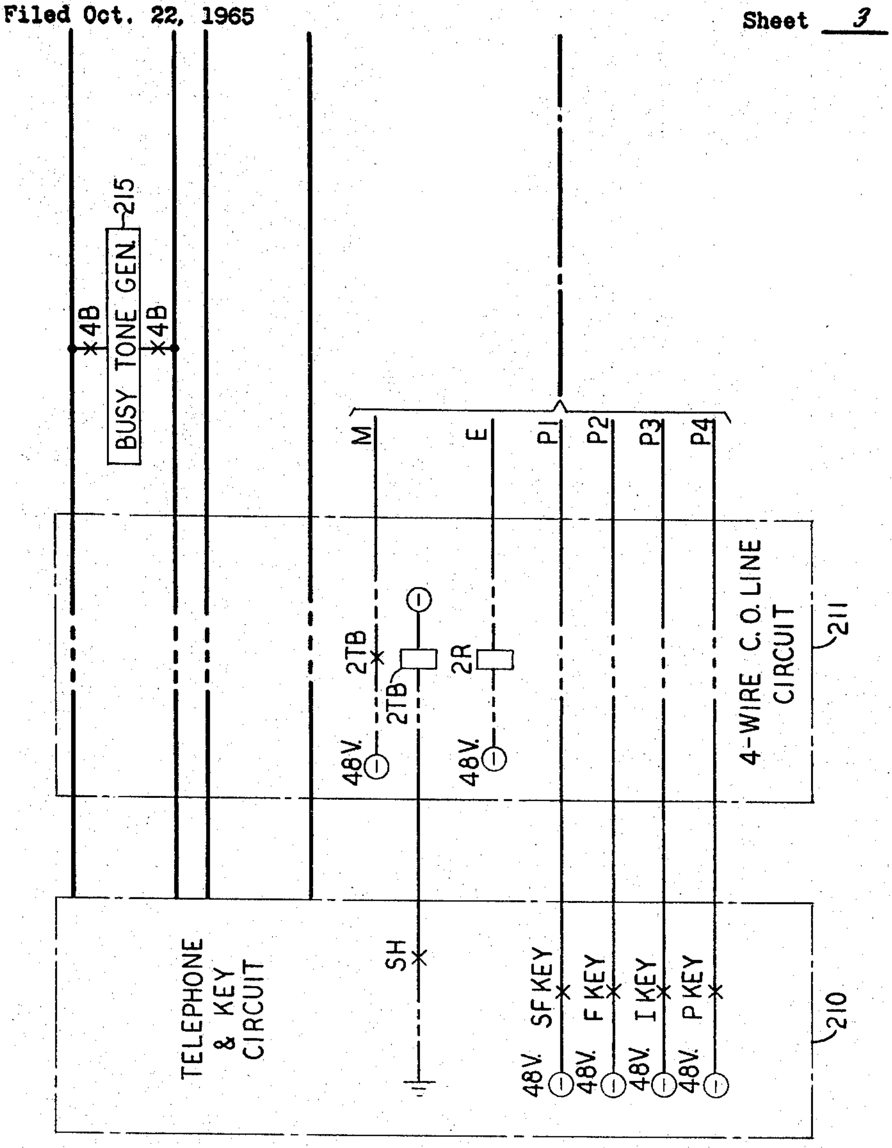
FIGS. 2–5 show the details of the dual access switches of FIGS. 1A and 1B.
Figure 6:
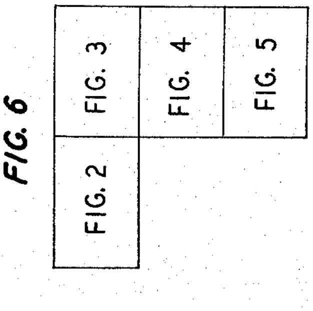
FIG. 6 shows the appropriate disposition of FIGS. 2–5.
Figure 3:
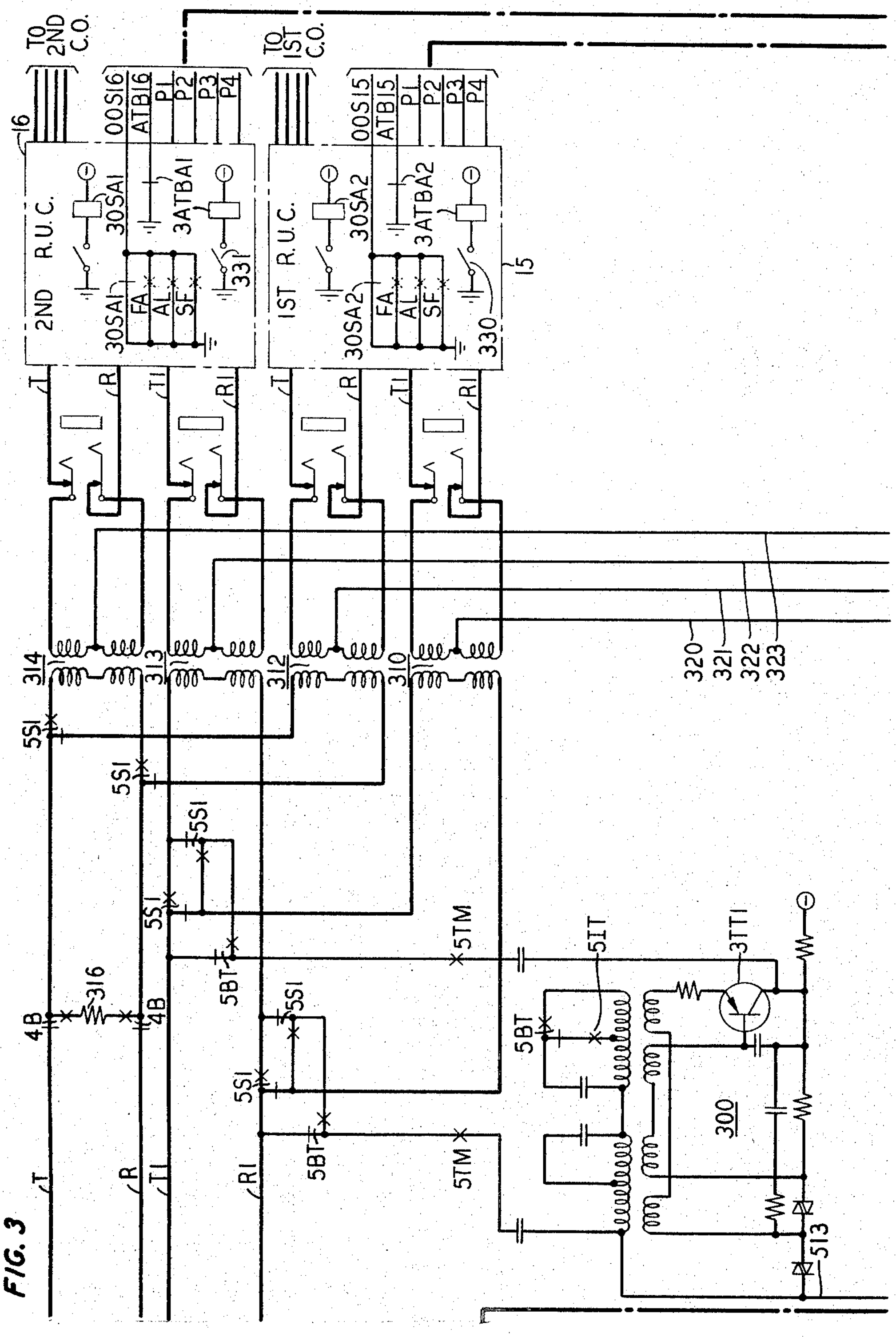
Figure 4:
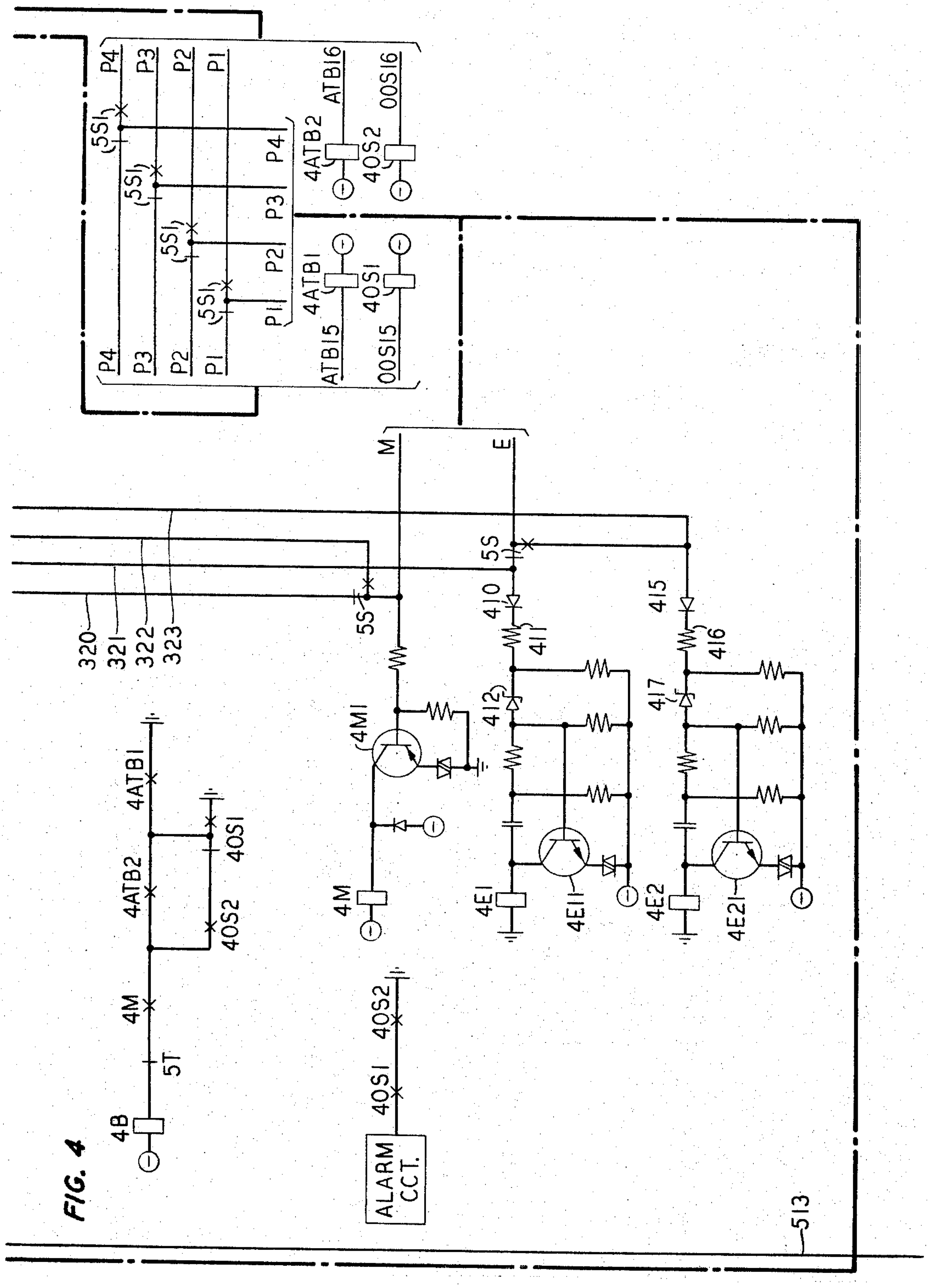
Figure 5:
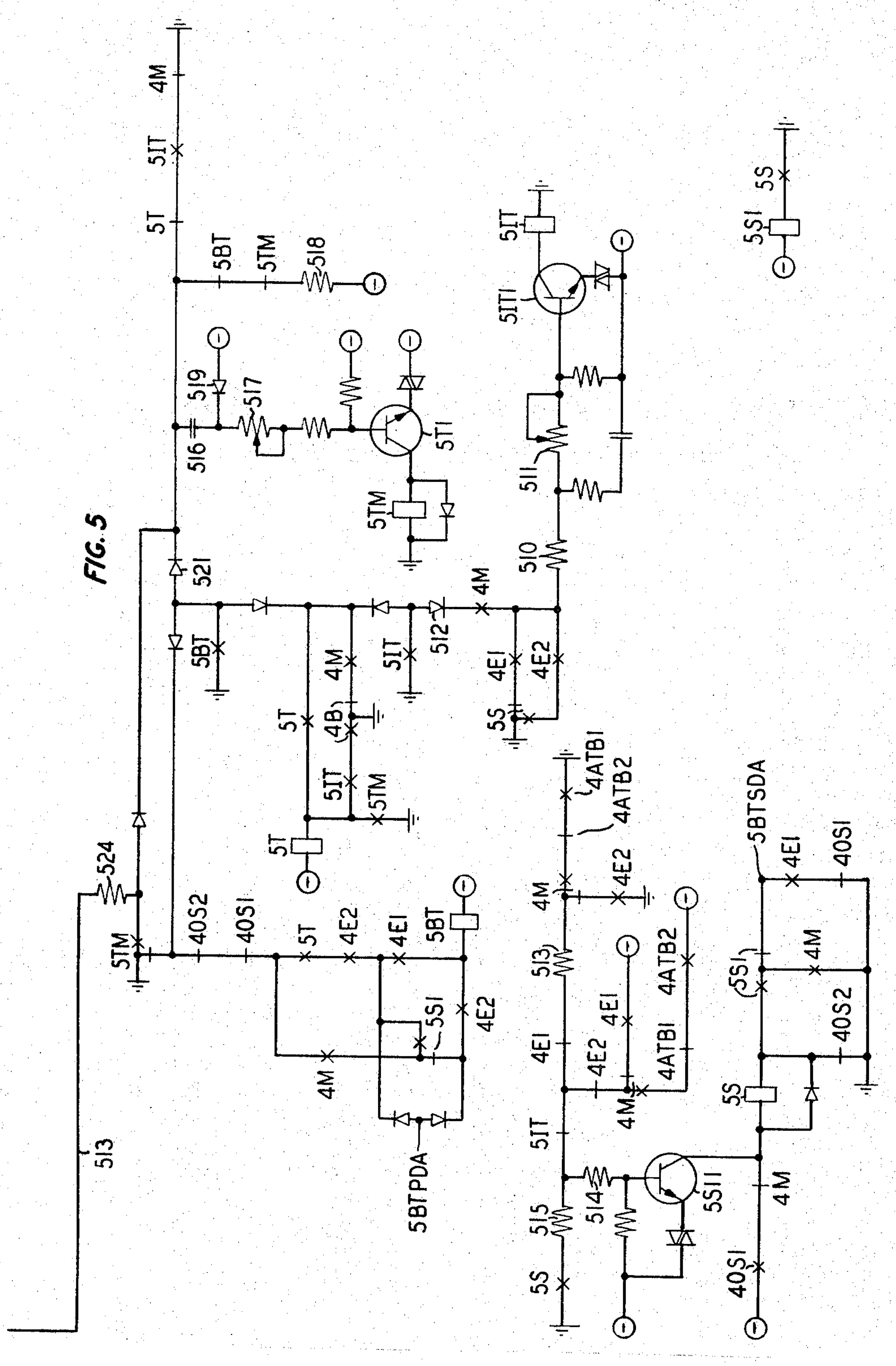

Referring now to FIGS. 2–4, it is seen that when the customer goes off-hook, conductor M is connected to negative battery potential over the contacts of relay 2TB which operated over switchhook contacts SH. Transistor 4M1 is energized, effecting the operation of relay 4M. Conductor M is also coupled over the contacts of relay 5S, conductor 320 and coil 310. In this manner conductor M is extended on a simplex basis over conductors T1 and R1 to concentrator 15 (assumed to be used for the prior call) extending to central office 11 (not shown, but see FIG. 1).

The operation or release of relay 5S1 governs which unit, 15 or 16, is coupled to the 4-wire line circuit 211. If relay 5S1 is released, line circuit 211 is extended to concentrator 15 and if relay 5S1 is operated, to concentrator 16. Relay 5S1 remains operated under control of relay 5S, in the position effected durnig the previous operation of the dual access switch. Line circuit 211 remains connected to concentrator 15 or 16 as determined by relay 5S1 unless an all trunks busy condition or an out-of-service condition exists at concentrator 15 or 16 as described herein in detail.

When the concentrator has recognized the service request call and extended the connection to the central office, in the manner referred to in the above-identified disclosure of G. F. Clement et al., dial tone is applied to the line and a start-dial indication is applied over conductor E. The E conductor from concentrator 15 which is extended from the midpoint of coil 312 over conductor 321 is energized by a ground simplex signal at the central office in a well-known manner and applies current to the base circuit of transistor 4E11 over a path which may be traced from the midpoint of coil 312, conductor 321, diode 410, resistance 411, Zener diode 412 to the base circuit of transistor 4E11. Relay 4E1 is thereupon operated and extends a ground condition to transistor 5IT1 to operate relay 5IT over a path including the contacts of relays 5S, 4E1, resistor 510 and potentiometer 511.

Relay 4E1 is released when ground is removed from the E conductor at the central office in a conventional manner. Thereafter, a path extends from ground, contacts of relay 5IT, diode 512, contacts of relay 4M, resistance 510 and potentiometer 511 to maintain transistor 5IT1 energized.

The operation of relay 5IT opens the input path to the base circuit of transistor 5S11 at the contacts of relay 5IT. In this manner relay 5S is prevented from changing its position and effecting a switching operation to the other remote unit.

If it is assumed that all trunks are busy at remote unit 15, and remote unit 16 is coupled to the line circuit in view of the operation of relay 5S1, a service request call will automatically be extended over concentrator unit 16.

If, however, concentrator 15, in which all trunks are busy, is connected to the line circuit 211 over the normally closed contacts of relay 5S1, a service request call cannot be extended until the customer line is coupled to concentrator unit 16 (assuming trunks are available thereat).

*All trunks busy at concentrator 15*

Relay 4ATB1 is operated over the contacts of relay 3ATBA2 at concentrator 15. The operation of all-trunks-busy relay 3ATBA2 is explained in detail in the above-referred-to Clement et al. application and shown symbolically by switch 330 in FIG. 3. Relay 4M is operated in the manner described above when the substation goes off-hook. At this time a path may be traced for the energization of transistor 5S11 from ground, contacts of relays 4ATB1, 4ATB2, 4M, resistance 513, contacts of relays 4E1, 5IT, resistance 514 to the base of transistor 5S11. Relay 5S is thereupon operated over the contacts or relay 4OS2. The operation of relay 5S extends the M lead from the base of transistor 4M1 to coil 313 over conductor 322 and over a simplex connection to concentrator 16. Moreover, the E conductor is connected to the midpoint of coil 314 over conductor 323 and over a simplex path to the second remote unit. Relay 5S1 is operated over the contacts of relay 5S. Thereupon the customer line and precedence leads P1–P4 are extended to the second remote unit 16 over the contacts of relay 5S1. Assuming that a trunk is available at concentrator 16, the call will proceed in the manner described above for a service request call.

*All trunks busy at concentrator 16*

If all trunks were busy at concentrator 16 and the line had remained connected thereto after the last call, it will be seen that relay 4ATB2 will be operated over the contacts of relay 3ATBA1. The latter is operated in a manner similar to that described above for relay 3ATBA2. Relay 4M is operated when the station goes off-hook in the manner described above. Thereupon a potential is extended over the contacts of relays 4ATB2, 4ATB1, 4M, 4E2, 5IT to the junction of resistors 514 and 515. The base current drive previously applied over the contacts of relay 5S and resistor 515 is now shunted and transistor 5S11 is de-energized, thereby releasing relay 5S. The release of relay 5S transfers the M and E conductors from the second remote unit to the first remote unit and opens the operating path of relay 5S1 causing it to release and to transfer the customer line and the precedence conductors P1–P4 to the first remote unit 15 (assuming that a trunk is available thereat for extension to the office). Thereafter the call will proceed as explained above for a service request call. The function of the precedence conductors which are used for signaling priority calls is explained in detail in the Clement et al. disclosure and is not essential to an understanding of the present invention.

*All trunks busy at both remote units*

Under these conditions relays 4ATB1 and 4ATB2 are operated over the contacts of the respective relays 3ATBA2 and 3ATBA1. When the station goes off-hook, relay 4M is operated in the manner described above and provides an operating path for relay 4B which may be traced from ground, contacts of relay 4ATB1, 4ATB2, 4M, 5T, winding of relay 4B to negative battery. Thereafter, the input circuit to transistor 5S11 is opened at the contacts of relays 4ATB1 and 4ATB2. This action prevents transfer of the subscriber line to the opposite remote unit.

The operation of relay 4B connects the receive pair T and R to busy tone from generator 215. Moreover, the receive pair is disconnected from the remote unit and also terminating resistor 316 is coupled to the receive pair extending to the remote unit. The busy tone signal supplied by generator 215 is indicative of the all trunks busy conditions of the remote units. Thereupon, the calling customer must either disconnect from the line or operate a precedence key SF, F, I or P to preempt a busy trunk as explained in the above-referred-to disclosure of G. F. Clement et al.

If a trunk becomes idle before a precedence key is operated, relay 3ATBA– associated with the remote unit having the idle trunk is operated causing relay 4ATB– to release. Relay 4B is thereupon released removing the busy tone and reconnecting the station to the remote unit.

If the attendant operates a precedence key the signal over conductors P1–P4 will be forwarded to the connected remote unit. Thereupon a trunk is made idle in the manner described in detail in the disclosure of G. F. Clement et al. filed on even date herewith. The associated relay 4ATB– will subsequently release causing the release of relay 4B in the manner described above.

*Out-of-service condition at concentrator 15*

If an out-of-service condition exists at concentrator unit 15, ground will be connected to relay 4OS1 over the contacts of relay 3OSA2 causing it to operate. Operation of the latter relay is shown symbolically. Operation of relay 4OS1 causes the operation of relay 5S over the contacts of relays 4OS1, 4M, winding of relay 5S, contacts of relay 4OS2 to ground. The operation of relay 5S causes the operation of relay 5S1 effecting a transfer to the other remote unit 16.

If the out-of-service condition had occurred while the dual access switch was operated and connected to the concentrator 15, the operate path for relay 5S would be opened by relay 4M. In this manner relay 5S cannot be changed in position when a connection has been established to the office through the first unit 15. However, relay 4M releases when the station disconnects and relay 5S is thereupon operated to initiate the transfer operation as described above.

*Out-of-service condition at concentrator 16*

If the out-of-service condition, occurs at the second remote unit 16, relay 4OS2 will be operated and the subsequent functions will be similar to those described above for an out-of-service condition at the first remote unit with the exception that relay 5S will be released at the contacts of relay 4OS2 in order to release relay 5S1 and connect the line to the first remote unit 15. Here again if the out-of-service condition obtains while the line is connected through concentrator 16, relay 5S remains operated over the contacts of relay 4M until the customer disconnects at which time a transfer is effected to the first unit 15.

If out-of-service conditions exist at both units, relays 4OS1 and 4OS2 are operated, but the line will remain connected through to the same concentrator if a calling connection exists until normal disconnect occurs. Relays 5S and 5S1, if operated, will release when relay 4M releases on disconnect.

*Terminating call*

When a line (connected to remote concentrator 15) is seized at the office, a ground is applied over the E simplex path and detected at the midpoint of coil 312. This path extends over conductor 321, diode 410, resistance 411, Zener 412 to the base circuit of transistor 4E11 to operate relay 4E1. The operation of relay 4E1 extends a path (in FIG. 5) from ground, contacts of relays 5S, 4E1, resistance 510, potentiometer 511 to the base of transistor 5IT1. Relay 5IT is operated and energizes contacts within the TOUCH-TONE generator 300 and also supplies a ground potential over the contacts of relays 4M, 5IT and 5T to capacitor 516. This capacitor charges and transistor 5T1 conducts for a predetermined interval determined by the capacitor and potentiometer 517. When transistor 5T1 conducts, relay 5TM operates causing relay 5T to operate. Ground is connected to the TOUCH-TONE generator 300 to energize transistor 3TT1 over the contacts of relay 5TM and conductor 513. Moreover, the contacts of relay 5BT extend the TOUCH-TONE generator 300 to the transmit pair T1, R1 of unit 15. The central office detects the tone supplied on the transmit pair as an idle indication and attempts to complete the call.

When capacitor 516 is charged, transistor 5T1 is de-energized and relay 5TM releases. Thereupon, a 24 volt potential is connected over resistance 518, contacts of relays 5TM, 5BT, to capacitor 516 to shift the potential of the lower electrode from approximately 23 volts negative to 47 volts negative with respect to ground. This voltage causes diode 519 to become forward biased and to supply a low resistance discharge path for the capacitor. Thus a fast recycle function is provided in order that busy tone may be supplied if another call arrives at the second remote unit.

Relay 5TM in releasing removes the ground condition from the TOUCH-TONE generator over conductor 513 and discontinues the generation of idle tone. Moreover, the output from the TOUCH-TONE generator 300 is disconnected from the transmit pair at the contacts of relay 5TM.

The operation of relay 5T removes the ground condition supplied to capacitor 516 to permit relay 5TM to release at the end of the timing cycle.

When relay 4M is operated as a result of the off-hook condition at the station in the manner described in detail above, conductor M is connected to the office through the contacts of relay 5S where it is simplexed to the first remote unit 15. The operation of relay 4M also supplies a ground potential over a path including the contacts of relay 5IT, diode 512, contacts of relay 4M, resistance 510, potentiometer 511 to the base of transistor 5ITI. Relay 5IT remains in the conducting condition (to prevent another call being connected through remote unit 16) until relay 4E1 is released by signals from the central office and the station returns to the on-hook condition.

*Line remains connected to other concentrator*

If the station is connected to remote unit 15 and a terminating call is extended over remote unit 16 ground is connected over the E conductor simplex when the line is seized. The ground is detected at the midpoint of coil 314 and applied to the base circuit of transistor 4E21. Base current is supplied to the transistor over a path including diode 415, resistance 416 and Zener diode 417. Transistor 4E21 thereupon conducts and effects the operation of relay 4E2. Since the incoming call is through the remote unit to which the line is not connected it is necessary that the line be transferred from concentrator 15 to concentrator 16.

When relay 4E2 operates in the manner described, ground is connected (in FIG. 5) over the contacts of relays 4E2, 4M, resistance 513, contacts of relays 4E1, 5IT, resistance 514 and the base of transistor 5S11. Relay 5S thereupon operates and causes the operation of relay 5S1.

The operation of relay 4E2 also provides a path for the energization of transistor 5IT1 which may be traced from ground, contacts of relays 5S, 4E2, resistor 510, potentiometer 511 to the base of transistor 5IT1.

Thereupon the connection is extended in the manner described in detail above with the information being transmitted to remote unit 16.

If a terminating call had arrived through the remote unit 15 while the station was connected to remote unit 16, ground would be connected on a simplex basis at the central office to conductors T and R to energize transistor 4E11 and operate relay 4E1. The latter connects a 24 volt potential over the contacts of relays 4M, 4E2 and 5IT to the base circuit of transistor 5S11. Thereupon transistor 5S11 is de-energized and relay 5S is released in turn releasing relay 5S1. The transmission channels are now connected to the first remote unit 15 and subsequent activities are similar to those described above.

If the station was busy on an incoming call, relays 5IT, 5T, 4M and 4E1 (if the call is through unit 15) would be operated. Relay 4E2 would be operated on a call from the second remote unit in the manner described above and in turn would cause the operation of relay 5BT over a path which may be traced (in FIG. 5) from ground, contacts of relays 5TM, 4OS2, 4OS1, 5T, 4E2 and 4E1, winding of relay 5BT to negative battery. The operation of relay 5BT completes a transformer connection in generator 300 and connects a ground condition through diode 521 to capacitor 516 to energize transistor 5T1, causing relay 5TM to operate. The latter connects the output of generator 300 to the channels to unit 16. Moreover, the operation of relay 5TM energizes the TOUCH-TONE generator over resistance 524 and conductor 513. The central office receives a busy tone from the TOUCH-TONE generator and delivers it to the calling station.

If the station was busy on a terminating call through the second remote unit and an additional call came through the first remote unit, the operation is similar to that described above with the exception that relay 4E1 would be operated and that relay 5S1 would operate to couple the busy tone over the make contacts of relay 5S1 to the first remote unit.

If simultaneous incoming calls are connected to both remote units, preference is allocated to that remote unit already connected to the station as determined by relay 5S1. If relay 5S1 is released the call extending through unit 15 will receive idle tone. If relay 5S1 had been operated the call connected to the second unit 16 will be preferred. Relays 4E1 and 4E2 would both be operated in view of the ground conditions at the central office but the contacts of these relays open the input path to transistor 5S11 to prevent relays 5S and 5S1 from changing position.

When one of the units is preferred the subsequent operations are similar to those described above for the preferred unit and the busy tone indication will be transmitted to the other unit also as described above.

Where tandem dual access switches are employed a busy condition at the substation is forwarded from a preceding dual access switch over a conductor from terminal 5BTSDA to operate relay 5BT at the succeeding dual access switch over terminal 5BTPDA. Moreover, an all-trunks-busy condition is forwarded from a succeeding dual access switch to a preceding dual access switch to operate the corresponding relay 4ATB1 or 4ATB2 in a manner similar to that effected by the concentrator. The series path including the contacts of relays 4ATB1 and 4ATB2 may be used for this purpose. A similar arrangement may be used for the operation of relays 4OS1 or 4OS2 to indicate an out-of-service condition to a preceding dual access switch over the contacts of relays 4OS1 and 4OS2.

It is to be understood that the above-described arrangements are merely illustrative of the applications of the principles of the invention. Numerous other arrangements may be devised by those skilled in the art without departing from the spirit and scope of the invention.

What is claimed is:

1. A telephone switching system including a plurality of substation lines, at least two central offices remote from each other, a plurality of duel access switches individual to said lines for selectively connecting said lines to said offices, remote concentrator switching means intermediate said access switches and said offices, and means at each said access switch effective in response to originating and terminating connections to said substation line individual thereto to couple said line over a selected concentrator to one of said offices including transfer means effective when in an operated condition for coupling said one line to one of said concentrators and effective when in a released condition to couple said one line to the other of said concentrators.

2. A telephone switching system in accordance with claim 1 wherein said transfer means for transferring said line includes means for extending an originating connection from said line over said concentrator means through which the most recent prior connection to said line was effected, and means including transistor means responsive to originating connections for maintaining said transfer means in the operated or released condition.

3. A telephone switching system including a plurality of remote substation lines, at least two central offices, a plurality of dual access switches individual to said lines for selectively connecting said lines to said offices, remote concentrator means intermediate said access switches and said offices, and means effective in response to an originating call at one of said lines and an all-trunks busy condition at one of said concentrator means for transferring said one line to another concentrator means having an idle trunk extending to said office.

4. A telephone switching system in accordance with claim 3 wherein said means for transferring said one line includes first transistor means responsive to the originating calling condition at said one line and second transistor means responsive to an all-trunks busy condition at said one concentrator and to an idle trunk condition at said other concentrator for controlling the transfer of said one line to said other concentrator.

5. A telephone switching system including a plurality of substation lines, at least two central offices, a plurality of dual access switches individual to said lines for effecting extensions between a particular line and a selected office, remote concentrator means connectable to said dual access switches, a plurality of trunks less in number than said lines for coupling said concentrator means to said offices, and means at said access switches effective in response to a terminating call over one of said concenrators to one of said lines for effecting the transfer of said one line to said concentrator extending said terminating connection.

6. A telephone switching system in accordance with claim 5 wherein said means for transferring said line includes first transistor means responsive to a supervisory condition indicative of a terminating connection, and second transistor means responsive to said first transistor means and the connection of said line to said other concentrator means for effecting a transfer to said concentrator means over which said terminating connection is extended.

7. A telephone switching system in accordance with claim 6 wherein said first transistor means includes a first transistor element responsive to supervisory conditions at said first concentrator means and a second transistor element responsive to supervisory conditions at said second concentrator means and wherein said second transistor means is responsive to said first and second transistor elements.

8. A telephone switching system in accordance with claim 7 including in addition signaling channels for controlling said first and second transistor elements and means responsive to said transfer means for coupling said signaling channels from said first and second concentrator means to said first and second transistor elements, respectively.

9. A telephone switching system in accordance with claim 8 wherein said signaling channels includes a simplex signaling path over a pair of conductors extending from said dual access switch to said concentrator means.

10. A telephone switching system including a plurality of remote substation lines, at least two central offices, a plurality of dual access switches individual to said lines for selecting one of said two offices, remote concentrator switching means individual to said offices, a plurality of trunks extending from said offices, said remote concentrators coupling said lines via said dual access switches to said trunks under control of said offices and means in said dual access switches effective in response to an out-of-service condition at one of said concentrator means for connecting said line individual to said switch to the other concentrator means.

11. A telephone switching system in accordance with claim 10 wherein said means for connecting said line to said other concentrator means includes relay means responsive to said out-of-service condition and to the connection of said line to said out-of-service concentrator means for transferring said line to said other concentrator means.

12. A telephone switching system including a plurality of substation lines, at least two central offices, a plurality of trunks less in number than said lines extending from said offices, a plurality of dual access switches individual to said lines for preparing the connection of said lines to a selected one of said offices, a plurality of remote concentrators connectable to said dual access switches, said concentrators being equal in number to the number of said offices to which said lines coupled to said dual access switches have access, said remote concentrators being effective under control of said office to couple said lines to said trunks, and means in said dual access switches effective in response to a terminating connection to one of said lines remaining connected to a first of said concentrators for effecting a transfer of said line to said second concentrator.

13. A telephone switching system in accordance with claim 12 wherein said means for transferring said line to said second concentrator includes first transistor means responsive to supervisory conditions from said second concentrator, and additional transistor means responsive to said first transistor means and to the connection of said line to said first concentrator for transferring the connection to said second concentrator.

14. A telephone line concentrator system including a plurality of remote substation lines, at least two central offices to which said lines have access, a plurality of trunks less in number than said lines extending from said office, a plurality of remote concentrators equal in number to said offices, a plurality of dual access switches equal in number to said lines for selectively extending said lines to said concentrators, said concentrators including means for coupling said lines over said dual access switches to selected trunks, and means in said dual access switches effective in response to a terminating connection to a line having a busy condition thereon for delivering a signal indicative thereof over said terminating connection.

15. A telephone line concentrator system including a plurality of remote substation lines, at least two central offices to which said lines have access, a plurality of trunks less in number than said lines extending from said offices, a plurality of dual access switches individual to said lines for preparing the connection of said lines to selected offices, a plurality of remote concentrators equal in number to said offices for extending said lines to said offices via said dual access switches, and means in said dual access switches effective in response to a terminating connection to one of said lines and to an all-trunks busy condition at both of said concentrators for returning busy tone over the terminating connection.

16. A communication switching system including a plurality of remote substation lines, at least three central offices, a plurality of trunks extending from said offices, a plurality of remote concentrators equal in number to said offices, preceding and succeeding tandemly connected dual access switches individual to one of said lines, means at said preceding dual access switch for selectively connecting said line to a first of said offices over a selected trunk from a first of said concentrators or to said succeeding dual access switch, and means at said succeeding dual access switch for coupling said line to a second or third of said offices over selected trunks from said second and third concentrators.

References Cited

UNITED STATES PATENTS

| | | | |
|---|---|---|---|
| 1,811,844 | 6/1931 | Dixon | 179—18 |
| 2,816,958 | 12/1957 | Wadsworth | 179—5 |
| 3,001,027 | 9/1961 | Armstrong et al. | 179—18 |

WILLIAM C. COOPER, *Primary Examiner*.